V. LINK.
FOLDING STARTING CRANK FOR MOTOR VEHICLES.
APPLICATION FILED FEB. 15, 1909.

1,059,675.

Patented Apr. 22, 1913.

2 SHEETS—SHEET 1.

Witnesses
J. G. Hinkel
J. J. McCarthy

Inventor
Vincent Link
By Factor, Freeman, Watson & Coit
Attorneys

V. LINK.
FOLDING STARTING CRANK FOR MOTOR VEHICLES.
APPLICATION FILED FEB. 15, 1909.
1,059,675.
Patented Apr. 22, 1913.
2 SHEETS—SHEET 2.
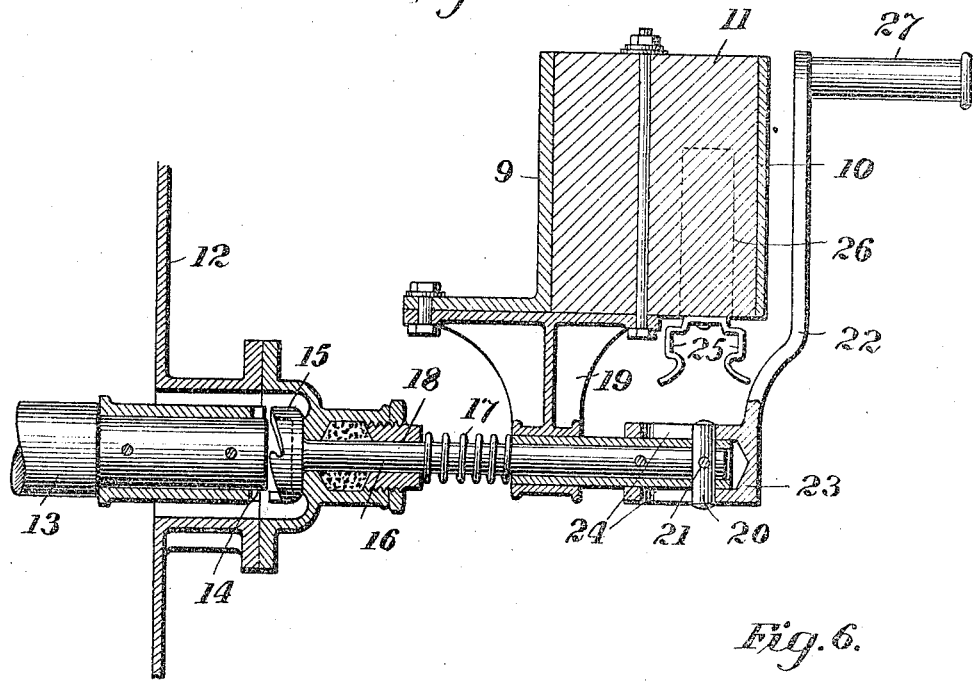
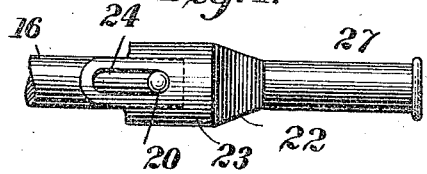
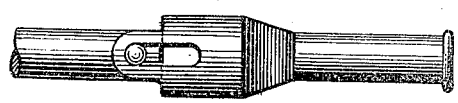
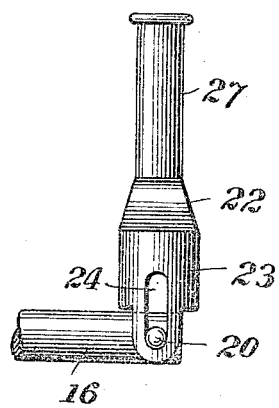
Witnesses
Inventor
Vincent Link
By
Foster, Freeman, Watson & Coit
Attorneys

UNITED STATES PATENT OFFICE.

VINCENT LINK, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

FOLDING STARTING-CRANK FOR MOTOR-VEHICLES.

1,059,675.  Specification of Letters Patent.  Patented Apr. 22, 1913.

Application filed February 15, 1909. Serial No. 477,933.

*To all whom it may concern:*

Be it known that I, VINCENT LINK, a citizen of the United States, and resident of Detroit, in the county of Wayne and State of Michigan, have invented certain new and useful Improvements in Folding Starting-Cranks for Motor-Vehicles, of which the following is a specification.

This invention relates to motor vehicles and particularly to a starting crank therefor which may be folded.

The invention is shown as applied to the starting shaft of a truck motor.

In most trucks in which the crank shaft of the motor is arranged longitudinally near the front of the vehicle, a starting crank is employed which projects forwardly of the frame in order that it may be in convenient position for cranking the motor. On account of its position therefore, the starting crank is frequently bent or broken by contact with obstructions met with in the use of the truck. Detachable starting cranks have been used to some extent, but are unsatisfactory because they are liable to be lost.

The main object of the present invention is to provide a starting crank which will project beyond the frame in convenient position for use in starting the motor and which when not in use may be folded to a safe position within the margin of the frame where it will be protected from accidental injury. Notwithstanding its ability to fold, the structure of the crank is such that it makes a firm and rigid connection with the starting shaft, when in operative position.

Figure 1:
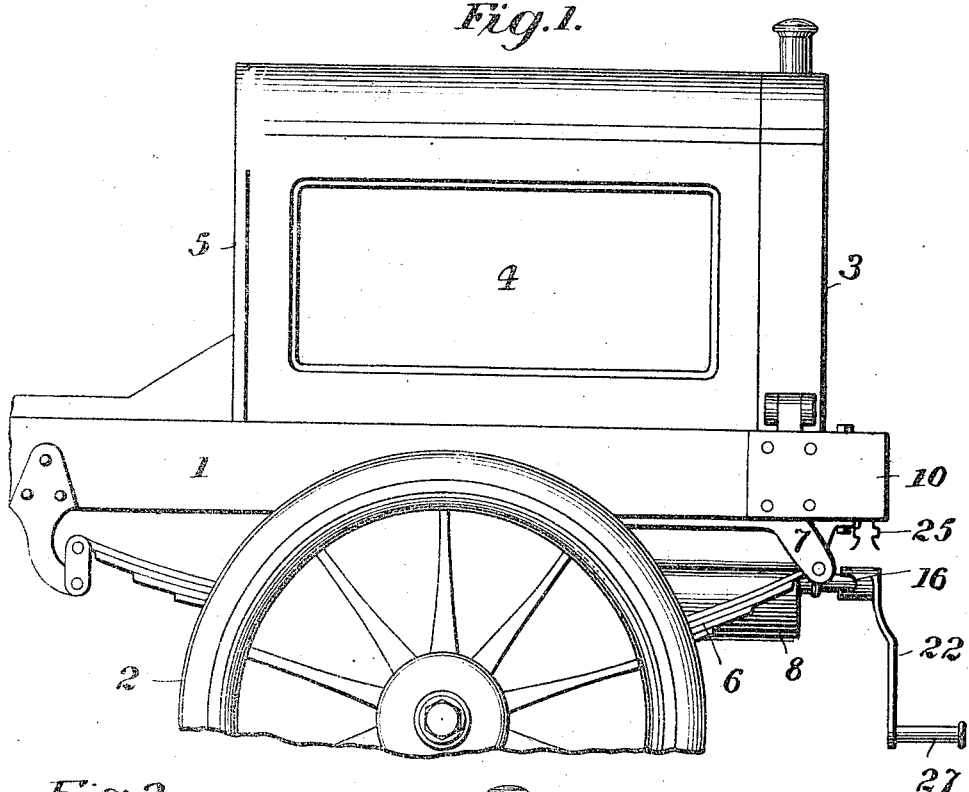
Figure 2:
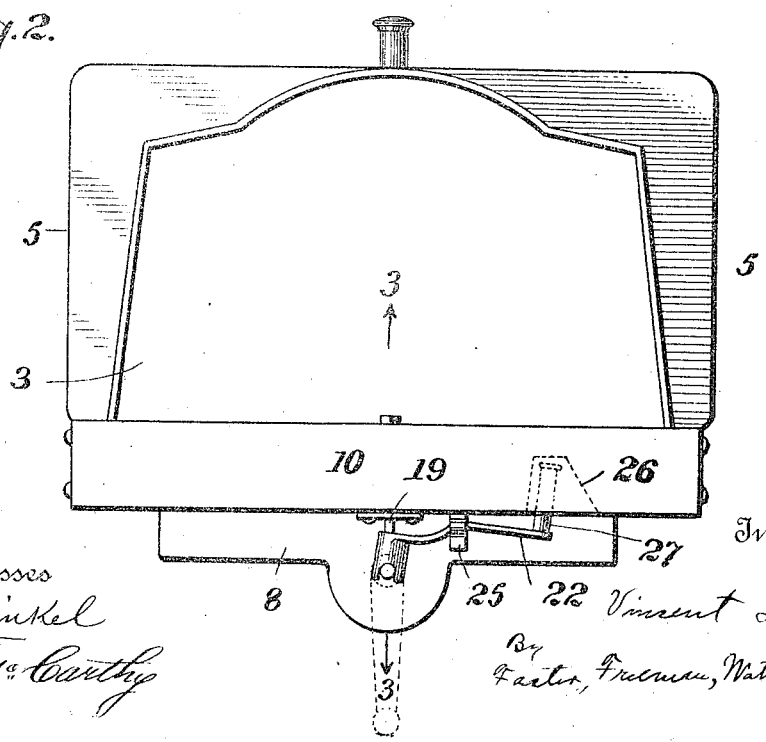

In the drawings,—Figure 1 is a side elevation of the forward part of a motor truck, showing the starting crank projecting in operative position; Fig. 2 is a front elevation of the truck shown in Fig. 1 with the starting crank in folded position in full lines and in operative position in dotted lines; Fig. 3 is a vertical longitudinal section through the forward part of the truck frame and the starting crank and connections, taken on the line 3—3 of Fig. 2; Fig. 4 is a bottom view of the starting crank shown in Fig. 3; Fig. 5 is a view similar to Fig. 4 with the starting crank ready to fold; and Fig. 6 is a view similar to Fig. 4 with the starting crank folded.

Various parts of the motor truck shown in the various figures may be designated as follows: 1 is the frame, 2 the front wheel, 3 the radiator, 4 the hood, 5 the dash, 6 the front spring and 7 the front hanger therefor.

8 represents the dust pan extending between the forward part of the crank case and the front cross beam of the frame.

The front cross bar 9 of the frame is shown in section in Fig. 3 and secured thereto by a steel strap 10 is a wood beam 11 which beam and strap act as a front bumper for the truck. It is intended that this bumper shall take any shocks due to collision with vehicles or other obstacles in the operation of the truck. Referring further to Fig. 3, a fragment of the motor crank case 12 is shown, housing the crank shaft 13 on the forward end of which is a clutch member 14 which coöperates with the clutch member 15 on the rear end of the starting shaft 16, which latter shaft is yieldably held in inoperative position by a suitable spring 17. It will be seen that the starting shaft is journaled in a suitable packed bearing 18 in the forward end of the crank case and in a bracket 19 bolted to the cross bar 9 and bumper 11 of the frame.

Heretofore, the starting crank has ordinarily been securely keyed to the front end of the shaft 16 and when not in use would hang as illustrated in Fig. 1, then being the most forward part of the vehicle and in a position where it would be liable to be injured by collisions as suggested above. In the present invention a transverse cylindrical key 20 passes through a suitable opening near the forward end of the starting shaft 16 and is secured thereto by a pin 21, and the starting crank 22 is formed with a hollow cylindrical hub 23 which is adapted to loosely fit the forward end of the starting shaft 16 and is provided with oppositely disposed longitudinal slots or keyways 24 in which the projecting ends of the key 20 are adapted to slide. The rear end of the hub 23 is somewhat cut away between the slots 24, thus leaving ears containing those slots, and with this construction it will be seen upon reference to Figs. 3 to 6 that the crank 22 may be drawn forward relative to the shaft 16 from its position shown in Figs. 3 and 4 to the position shown in Fig. 5, and when in said latter position the crank may be turned bodily on the key 20 as a pivot into the position shown in Fig. 6, wherein the hub of the starting crank is at a right angle to the starting shaft. As the shaft 16 is wholly within the forward edge of the bumper 10, the starting crank when folded to the position shown in Fig. 6 is also within the forward edge of said bumper and may then be turned to the position shown in Fig. 2 in full lines and secured against the bumper 10 by a spring clip 25. For convenience in holding the starting crank closer to the bumper an opening 26 is made in the wood beam 11 to house the handle 27 of the starting crank. The construction of the spring clip 25 is fully illustrated in Figs. 1, 2, and 3 and need not be further described.

It will be noted that a rearward force applied to the crank will lock the same against folding movement on the starting shaft while a forward movement will unlock the same so that it can be moved to folding position. This is a convenient arrangement since a rearward movement is necessarily given to the crank and the starting shaft so as to clutch the starting shaft with the crank shaft. Therefore by applying a rearward force to the crank this crank is simultaneously locked on the starting shaft and the starting shaft is thrown into engagement with the crank shaft.

Having thus described the invention, what is claimed is:

1. In a motor vehicle, the combination with the frame and a bumper thereon, of a hydrocarbon motor carried by said frame, a starting shaft for said motor, a starting crank connected to said shaft projecting beyond said bumper, and means for folding said crank to a position within the margin of said bumper.

2. In a motor vehicle, the combination with the vehicle frame, of a hydrocarbon motor carried thereby, a starting shaft for said motor, a starting crank connected to said shaft projecting beyond said frame, means for folding said crank to a position within the margin of said frame, and means for securing said folded crank to said frame.

3. In a motor vehicle, the combination with the frame, provided with a front cross beam constituting a bumper, of a hydrocarbon motor carried by the frame, a starting crank for said motor projecting beyond said bumper, means for folding said crank beneath said bumper, and means for securing the folded crank to said bumper.

4. In a motor vehicle, the combination with the frame, provided with a front cross beam constituting a bumper, of a hydrocarbon motor carried by the frame, a starting crank for said motor projecting beyond said bumper, means for folding said crank, the said bumper being provided with a recess to receive the handle of said crank when folded, and a spring catch on the frame for engaging the arm of said crank and retaining it in folded position.

5. In a motor vehicle, the combination with the vehicle frame, of a hydrocarbon motor carried by said frame, a starting shaft for said motor, a starting crank connected to said shaft and projecting beyond the forward part of said frame, and means for folding said crank to a position within the margin of the front of said frame.

6. In a motor vehicle, the combination with the vehicle frame, of a hydrocarbon motor carried by said frame, a radiator on the front of said frame, a starting shaft for said motor, a starting crank connected to said shaft and projecting beyond the radiator, and means for folding said crank underneath the radiator.

7. The combination with an automobile frame and the crank-shaft of an automobile, of a longitudinally movable starting crank supported by the automobile frame and adapted to be moved out of alinement with the crank-shaft and means for holding the crank in said position.

In testimony whereof I affix my signature in presence of two witnesses.

VINCENT LINK.

Witnesses:
C. J. DALE,
E. N. HEARN.